(12) United States Patent
Oh

(10) Patent No.: US 12,384,327 B2
(45) Date of Patent: Aug. 12, 2025

(54) ELECTRONIC PARKING BRAKE SYSTEM AND METHOD OF CONTROLLING THE SAME

(71) Applicant: HL MANDO CORPORATION, Pyeongtaek-si (KR)

(72) Inventor: Taewoong Oh, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 251 days.

(21) Appl. No.: 18/120,065

(22) Filed: Mar. 10, 2023

(65) Prior Publication Data
US 2023/0286462 A1 Sep. 14, 2023

(30) Foreign Application Priority Data
Mar. 10, 2022 (KR) ........................ 10-2022-0030151

(51) Int. Cl.
| | |
|---|---|
| *B60R 25/08* | (2006.01) |
| *B60Q 9/00* | (2006.01) |
| *B60R 25/20* | (2013.01) |
| *B60T 7/16* | (2006.01) |
| *B60T 8/32* | (2006.01) |
| *B60T 13/74* | (2006.01) |

(52) U.S. Cl.
CPC ............... *B60R 25/08* (2013.01); *B60Q 9/00* (2013.01); *B60R 25/083* (2013.01); *B60R 25/086* (2013.01); *B60T 7/16* (2013.01); *B60T 8/321* (2013.01); *B60T 13/74* (2013.01); *B60T 13/741* (2013.01); *B60T 13/748* (2013.01); *B60R 25/2018* (2013.01)

(58) Field of Classification Search
CPC ..... B60R 25/08; B60R 25/083; B60R 25/086; B60R 25/09; B60R 25/20; B60R 25/2018; B60T 7/16; B60T 8/321; B60T 8/329; B60T 13/74; B60T 13/741; B60T 13/748
USPC .......................... 701/70, 78, 79, 93, 97, 98
See application file for complete search history.

(56) References Cited

U.S. PATENT DOCUMENTS

| | | | | |
|---|---|---|---|---|
| 6,293,363 | B1 * | 9/2001 | Rangaswamy | ....... B60T 13/741 188/158 |
| 6,406,102 | B1 * | 6/2002 | Arnold | ................... B60T 13/74 303/20 |
| 2007/0168104 | A1 * | 7/2007 | Nelson | ..................... B60T 7/16 307/10.6 |
| 2017/0291578 | A1 * | 10/2017 | Pticyn | ................... F16D 55/226 |
| 2018/0236974 | A1 * | 8/2018 | Kubb | ..................... B60T 17/22 |

FOREIGN PATENT DOCUMENTS

| | | |
|---|---|---|
| JP | 2002-160603 A | 6/2002 |
| JP | 2004-299562 A | 10/2004 |

* cited by examiner

*Primary Examiner* — Erick R Solis
(74) *Attorney, Agent, or Firm* — Hauptman Ham, LLP

(57) ABSTRACT

Disclosed herein is an electronic parking brake system including an electronic parking brake that provides a braking force to a vehicle, and a controller that is electrically connected to the electronic parking brake and controls the electronic parking brake, wherein the controller performs theft prevention control by the electronic parking brake according to a driving state of a stolen vehicle, based on reception of a theft prevention request.

16 Claims, 5 Drawing Sheets

ELECTRONIC PARKING BRAKE SYSTEM AND METHOD OF CONTROLLING THE SAME

CROSS-REFERENCE TO RELATED APPLICATION

This application claims the benefit of Korean Patent Application No. 10-2022-0030151, filed on Mar. 10, 2022, in the Korean Intellectual Property Office, the disclosure of which is incorporated herein by reference.

BACKGROUND

1. Field

Embodiments of the present disclosure relate to an electronic parking brake system having an electronic parking brake operated by a motor, and a method of controlling the same.

2. Description of the Related Art

In general, as a key-insertion and rotation-type start-up method is changed to a smart key, a digital key, or the like, in which a physical key disappears, technologies for preventing stealing of a vehicle have been introduced in various manners.

An electronic parking brake system increases a torque generated from a motor through a reducer to generate a braking force required for parking by a mechanical structure device inside a caliper.

In recent years, technologies for stopping the vehicle by using the electronic parking brake system when the vehicle is stolen have been developed.

However, in the related art, when the vehicle is stolen, a constant braking force is generated regardless of a driving state of the stolen vehicle. Accordingly, when a relatively large braking force is generated in a driving condition of the stolen vehicle, the stolen vehicle is suddenly stopped, and thus an accident may occur. Further, when a relatively small braking force is generated in the driving condition of the stolen vehicle, the stolen vehicle cannot be stopped. In addition, considering a case in which a vehicle thief additionally manipulates an accelerator pedal to prevent the stolen vehicle from stopping, it is more difficult to safely and reliably stop the stolen vehicle using only a manner of generating a constant braking force.

RELATED ART DOCUMENT

Patent Document (Patent Document 1) Japanese Patent Application Publication No. 2002-160603 (published on Jun. 4, 2002)

SUMMARY

Therefore, it is an aspect of the present disclosure to provide an electronic parking brake system which safely and reliably stops a stolen vehicle by generating a braking force for stop control according to a driving state of the stolen vehicle when a theft prevention request is received, and a method of controlling the same.

Additional aspects of the disclosure will be set forth in part in the description which follows and, in part, will be obvious from the description, or may be learned by practice of the disclosure.

In accordance with one aspect of the present disclosure, an electronic parking brake system includes an electronic parking brake that provides a braking force to a vehicle, and a controller that is electrically connected to the electronic parking brake and controls the electronic parking brake. The controller performs theft prevention control with the electronic parking brake according to a driving state of a stolen vehicle, based on reception of a theft prevention request.

The controller may perform deceleration control in which a deceleration of the stolen vehicle is maintained at a target deceleration until the stolen vehicle is stopped by engaging the electronic parking brake, based on driving of the stolen vehicle.

The controller may forcibly engage the electronic parking brake, based on stopping of the stolen vehicle by the deceleration control.

The controller may forcibly engage the electronic parking brake while the stolen vehicle is stopping.

While performing the theft prevention control, the controller may ignore a parking release request from an electronic parking brake (EPB) switch and prohibit an operation stop of the electronic parking brake or a release of the electronic parking brake.

The controller may perform deceleration control in which a deceleration of the stolen vehicle is maintained at a target deceleration until the stolen vehicle is stopped by engaging the electronic parking brake, based on a speed of the stolen vehicle, which is higher than a preset speed, and may forcibly engage the electronic parking brake, based on the speed of the stolen vehicle, which is lower than the preset speed.

The controller may start the theft prevention control at a time point at which an engagement of the electronic parking brake is requested.

The controller may start deceleration control in which a deceleration of the stolen vehicle is maintained at a target deceleration until the stolen vehicle is stopped by engaging the electronic parking brake at a time point at which a speed of the stolen vehicle is lower than a preset speed.

The controller may output theft prevention control completion so that a vehicle owner identifies completion of the theft prevention control, based on the completion of the theft prevention control.

The controller may release the theft prevention control, based on reception of a theft prevention release request.

The electronic parking brake system may further include a warner that guides information to a driver. The controller may output, to the warner, information notifying that the theft prevention control is released, based on the reception of the theft prevention release request.

The controller may output, to the warner, information notifying that a release of the electronic parking brake is permitted, based on forcibly engaging of the electronic parking brake by the theft prevention control.

In accordance with another aspect of the present disclosure, a method of controlling an electronic parking brake system that controls an electronic parking brake that provides a braking force to a vehicle includes determining whether a theft prevention request is received, determining a driving state of a stolen vehicle, based on the reception of the theft prevention request, and performing theft prevention control by with the electronic parking brake according to the driving state of the stolen vehicle.

The performing of the theft prevention control may include performing deceleration control in which a deceleration of the stolen vehicle is maintained at a target deceleration until the stolen vehicle is stopped by engaging the electronic parking brake, based on driving of the stolen vehicle, and forcibly engaging the electronic parking brake, based on stopping of the stolen vehicle by the deceleration control.

The performing of the theft prevention control may include ignoring a parking release request from an electronic parking brake (EPB) switch while the theft prevention control is performed and prohibiting an operation stop of the electronic parking brake or a release of the electronic parking brake.

The performing of the theft prevention control may include starting the theft prevention control at a time point at which engagement of the electronic barking brake is requested or at a time point at which a speed of the stolen vehicle is lower than a preset speed.

The method may further include outputting theft prevention control completion so that a vehicle owner identifies completion of the theft prevention control, based on the completion of the theft prevention control.

The method may further include releasing the theft prevention control, based on reception of a theft prevention release request, and outputting information notifying that a release of the electronic parking brake is permitted, based on forcible engaging of the electronic parking brake by the theft prevention control.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
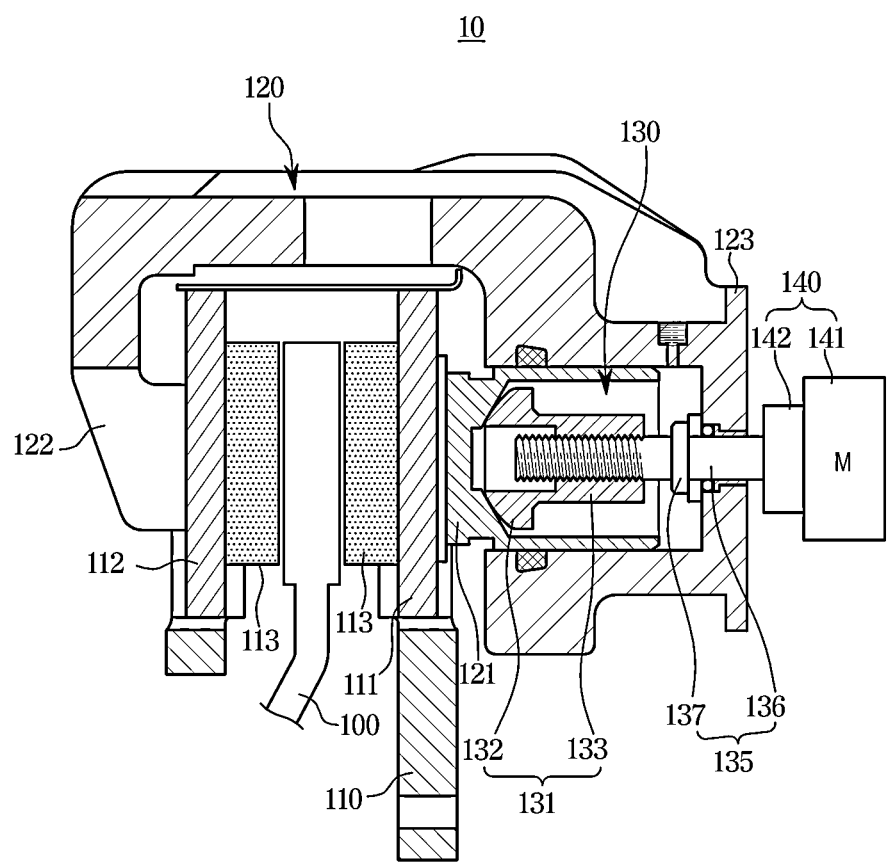
FIG. 1 is a diagram of an electronic parking brake included in an electronic parking brake system according to an embodiment.

Throughout the specification, the same reference numerals refer to the same components. The present specification does not describe all components of the embodiments, and general content in the technical field to which the present disclosure pertains or duplicated content between the embodiments will be omitted. The terms "unit," "module," "member," and "block" used in the specification may be implemented as software or hardware, and according to embodiments, a plurality of "units," "modules," "members," and "blocks" may be implemented as a single component or one "unit," "module," "member," or "block" may include a plurality of components.

Throughout the specification, when it is described that a first component is "connected" to a second component, this includes not only a case in which the first component is directly connected to the second component but also a case in which the first component is indirectly connected to the second component, and the indirect connection includes connection through a wireless communication network.

Further, when a part "includes" a component, this does not mean that other components are excluded but in fact other components may be further included unless otherwise stated.

Throughout the specification, when a first member is located "on" a second member, this includes not only a case in which the first member is in contact with the second member but also a case in which a third member is present between the two members.

Terms such as "first" and "second" are used to distinguish one component from another component, and components are not limited by the above-described terms. Singular expressions include plural expressions unless clearly otherwise indicated in the context.

In each of operations, an identification code is used for convenience of description and does not describe a sequence of the operations, and the operations may be performed in a different order from the specified order unless the context clearly states a specific order.

FIG. 1 is a diagram of an electronic parking brake included in an electronic parking brake system according to an embodiment.

Referring to FIG. 1, an electronic parking brake 10 may include a carrier 110 in which a pair of pad plates 111 and 112 are installed to move forward or rearward to press a brake disc 100 rotating together with a wheel of a vehicle, a caliper housing 120 provided with a cylinder 123 slidably installed in the carrier 110 and installed so that a piston 121 moves forward or rearward under a braking hydraulic pressure, a power converter 130 configured to press the piston 121, and a motor actuator 140 configured to transmit a rotational force to the power converter 130 using a motor M.

The pair of pad plates 111 and 112 may be divided into an inner pad plate 111 disposed in contact with the piston 121 and an outer pad plate 112 disposed in contact with a finger portion 122 of the caliper housing 120. The pair of pad plates 111 and 112 may be installed on the carrier 110 fixed to a vehicle body to move forward or rearward toward both sides of the brake disc 100. Further, a brake pad 113 may be attached to one surface of each of the pad plates 111 and 112 facing the brake disc 100.

The caliper housing 120 may be slidably installed in the carrier 110. In more detail, the caliper housing 120 may include the cylinder 123 on a rear side thereof in which the power converter 130 is installed and the piston 121 is embedded to move forward or rearward and the finger portion 122 formed to be bent on a front side thereof in a downward direction to operate the outer pad plate 112. The finger portion 122 and the cylinder 123 may be integrally formed.

The piston 121 may be provided in a cylindrical shape having a cup-shaped interior and slidably inserted into the cylinder 123. The piston 121 may press the inner pad plate 111 toward the brake disc 100 with an axial force of the power converter 130 configured to receive the rotational force of the motor actuator 140. Accordingly, when the axial force of the power converter 130 is applied, the piston 121 moves forward toward the inner pad plate 111 to press the inner pad plate 111, the caliper housing 120 operates in a direction opposite to the piston 121 due to a reaction force so that the finger portion 122 presses the outer pad plate 112 toward the brake disc 100, and thus braking can be performed.

The power converter 130 may serve to press the piston 121 toward the inner pad plate 111 by receiving the rotational force from the motor actuator 140.

The power converter 130 may include a nut member 131 that is installed to be disposed inside the piston 121 and is in contact with the piston 121 and a spindle member 135 screw-coupled to the nut member 131.

The nut member 131 may be disposed inside the piston 121 in a rotation-restricted state and screw-coupled to the spindle member 135.

The nut member 131 may include a head portion 132 provided in contact with the piston 121 and a coupling portion 133 extending from the head portion 132 and having a female thread formed on an inner circumferential surface thereof to be screw-coupled to the spindle member 135.

The nut member 131 may serve to press the piston 121 or release the pressing of the piston 121 while moving in a forward direction or a rearward direction according to a rotation direction of the spindle member 135. In this case, the forward direction may be a movement direction in which the nut member 131 approaches the piston 121. The rearward direction may be a movement direction in which the nut member 131 moves away from the piston 121. In addition, the forward direction may be a movement direction in which the piston 121 approaches the brake pad 113. The rearward direction may be a movement direction in which the piston 121 moves away from the brake pad 113.

The spindle member 135 may include a shaft 136 passing through a rear portion of the caliper housing 120 and rotating by receiving the rotational force of the motor actuator 140, and a flange portion 137 extending radially from the shaft 136. One side of the shaft 136 may be rotatably installed to pass through a rear side of the cylinder 123, and the other side thereof may be disposed inside the piston 121. In this case, the one side of the shaft 136 passing through the cylinder 123 may be connected to an output shaft of a reducer 142 to receive the rotational force of the motor actuator 140.

The motor actuator 140 may include a motor 141 and the reducer 142.

The motor 141 may rotate the spindle member 135 to move the nut member 131 forward or rearward to press the piston 121 or release the pressing of the piston 121.

The reducer 142 may be provided between an output side of the motor 141 and the spindle member 135.

Due to the above configuration, the electronic parking brake 10 may press the piston 121 by moving the nut member 131 by rotating the spindle member 135 in one direction using the motor actuator 140 when parking is performed. The piston 121 pressed by the movement of the nut member 131 may press the inner pad plate 111 to bring the brake pad 113 into close contact with the brake disc 100, thereby generating an engaging force.

Further, the electronic parking brake 10 rotates the spindle member 135 in an opposite direction using the motor actuator 140 when the parking is released so that the nut member 131 pressed by the piston 121 may move rearward. The pressing on the piston 121 may be released by the rearward movement of the nut member 131. By releasing the pressing on the piston 121, the brake pad 113 is spaced apart from the brake disc 100, and thus the generated engaging force may be released.

Figure 2:
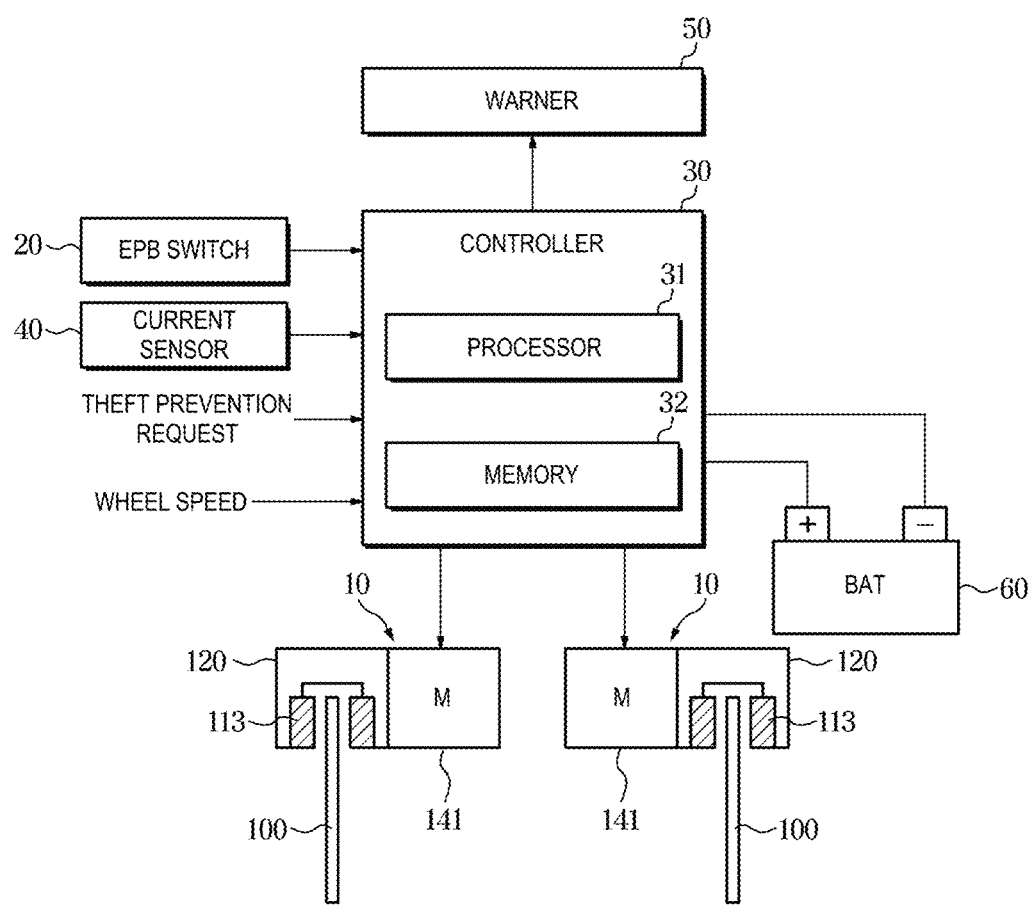
FIG. 2 is a control block diagram of the electronic parking brake system according to the embodiment.

FIG. 2 is a control block diagram of the electronic parking brake system according to the embodiment.

Referring to FIG. 2, the electronic parking brake system may include the electronic parking brake 10, an electronic parking brake (EPB) switch 20, a controller 30, a current sensor 40, and a warner 50.

The electronic parking brake 10 may provide a parking braking force to the brake disc 100 rotating together with wheels, for example, left and right rear wheels, of the vehicle.

The electronic parking brake 10 generates the parking braking force for each rear wheel. The electronic parking brake 10 is controlled by the electrically connected controller 30.

The electronic parking brake 10 is operated by the motor 141 to generate the parking braking force. The electronic parking brake 10 may operate the motor 141 to press the brake pad 113 inside the caliper housing 120 on the left and right rear wheels to generate the parking braking force.

The EPB switch 20 is a switch configured to receive an intention of a driver to operate the electronic parking brake 10 and may be provided adjacent to a driver's seat of the vehicle.

The EPB switch 20 is provided to be turned on or off by the driver.

The EPB switch 20 transmits, to the controller 30, a signal corresponding to a braking operation command (fastening command) when the EPB switch 20 is turned on and a signal corresponding to a parking release command (unfastening command) when the EPB switch 20 is turned off.

The current sensor 40 may be provided to detect a current flowing through the motor 141 of the electronic parking brake 10. The current sensor 40 may detect a motor current flowing through the motor 141 using a shunt resistor or a Hall sensor. Various methods that can detect the motor current in addition to the shunt resistor and the Hall sensor may be applied to the current sensor 40.

The warner 50 may be a warning light, a cluster, or a combination thereof. The warner 50 may warn the driver through video, audio or both.

The warner 50 may output a message or a warning sound indicating that the theft prevention control is operating to warn a vehicle thief.

The controller 30 may be called an electronic control unit (ECU).

The controller 30 may include a processor 31 and a memory 32.

The processor 31 may include a digital signal processor configured to process information related to the operation of the electronic parking brake 10 and a micro control unit (MCU) configured to generate a motor driving signal for the parking operation, the parking release, or the theft prevention control of the electronic parking brake 10.

The memory 32 may store a program and/or data for processing the information related to the operation of the electronic parking brake 10 and a program and/or data for generating the motor driving signal for the parking operation, the parking release or the theft prevention control of the electronic parking brake 10 by the processor 31.

The memory 32 may temporarily store the information related to the operation of the electronic parking brake 10 and temporarily store a processing result of the information related to the operation of the electronic parking brake 10 by the processor 31.

The memory 32 may include not only a volatile memory such as a static random access memory (S-RAM) or a dynamic RAM (D-RAM) but also a non-volatile memory such as a flash memory, a read only memory (ROM), or an erasable programmable ROM (EPROM).

The controller 30 receives power from a battery 60.

The controller 30 supplies the power provided from the battery 60 to the motor 141 of the electronic parking brake 10 to drive the motor 141 and generate the parking braking force. When the motor 141 of the electronic parking brake 10 is driven to generate or release the parking braking force, the controller 30 may supply or block the power to or from the motor M and 141.

The controller 30 may drive the motor 141 of the electronic parking brake 10. The controller 30 may drive the motor 141 in a forward rotation direction or a rearward rotation direction. For example, the controller 30 may include an H-bridge circuit including a plurality of power switching elements to drive the motor 141 in the forward rotation direction or the rearward rotation direction.

The controller 30 may communicate with various systems mounted on the vehicle through a network bus. Ethernet, media oriented systems transport (MOST), FlexRay, a controller area network (CAN), a local interconnect network (LIN), and the like may be used as the network bus.

The controller 30 may communicate with various systems mounted on the vehicle to receive information such as a wheel speed and the theft prevention request. The wheel speed may include speeds of four wheels of the vehicle. The theft prevention request is a signal generated when vehicle theft occurs. The theft prevention request may be generated by the vehicle itself and transmitted to the controller 30 on the basis of determination by the vehicle that the vehicle has been stolen. Further, when a vehicle owner manipulates a mobile phone to transmit the theft prevention request, the controller 30 may directly receive the theft prevention request or the theft prevention request may be provided from another device of the vehicle receiving the theft prevention request.

The controller 30 may perform a parking operation mode or a parking release mode according to an operation signal of the EPB switch 20 or an operation signal generated by a program related to the operation of the electronic parking brake 10.

In the parking operation mode, the controller 30 determines whether a current motor current reaches a target current and terminates the parking operation control on the basis of the reaching the target current.

Meanwhile, when the theft prevention request is received, the controller 30 may determine that vehicle theft has occurred and perform a theft prevention mode for forcibly stopping the stolen vehicle.

In the theft prevention mode, different theft prevention controls are performed according to a driving state of the stolen vehicle.

In the theft prevention mode, when the stolen vehicle is driving, the electronic parking brake 10 is operated to generate a braking force, and thus the stolen vehicle is decelerated at a target deceleration until the stolen vehicle stops.

In the theft prevention mode, when the stolen vehicle is stopped, the electronic parking brake 10 is forcibly engaged to prevent the stolen vehicle from moving.

When the theft prevention mode is operated, the controller 30 may output, through the warner 50, a message or a warning sound informing that the theft prevention control is operating, to warn the vehicle thief that the theft prevention control is operating.

In the theft prevention mode, when the stolen vehicle is driving, the controller 30 generates the braking force from the electronic parking brake 10 until the stolen vehicle is stopped, decelerates the stolen vehicle at the target deceleration, and thus safely and securely stops the stolen vehicle.

In the theft prevention mode, when the stolen vehicle is stopped, the controller 30 forcibly engages the electronic parking brake 10 to prevent the stolen vehicle from moving.

While the theft prevention mode is performed, even when the parking release command is input by the EPB switch 20, the controller 30 ignores the parking release command and prohibits the parking release.

Upon receiving a theft prevention release request for releasing the theft prevention control, the controller 30 releases the theft prevention mode.

When the theft prevention mode is released, the controller 30 outputs a guide message or a sound according to the release of the theft prevention mode to notify that the theft prevention mode is released, and to guide a method for returning the vehicle to a state prior to the theft prevention mode.

When the theft prevention mode is released, the controller 30 no longer decelerates the vehicle at the target deceleration while the vehicle is driving. Further, when the vehicle is stopped and the driver operates the EPB switch 20, the parking release is performed to release the forcibly engaging of the electronic parking brake 10.

Figure 3:
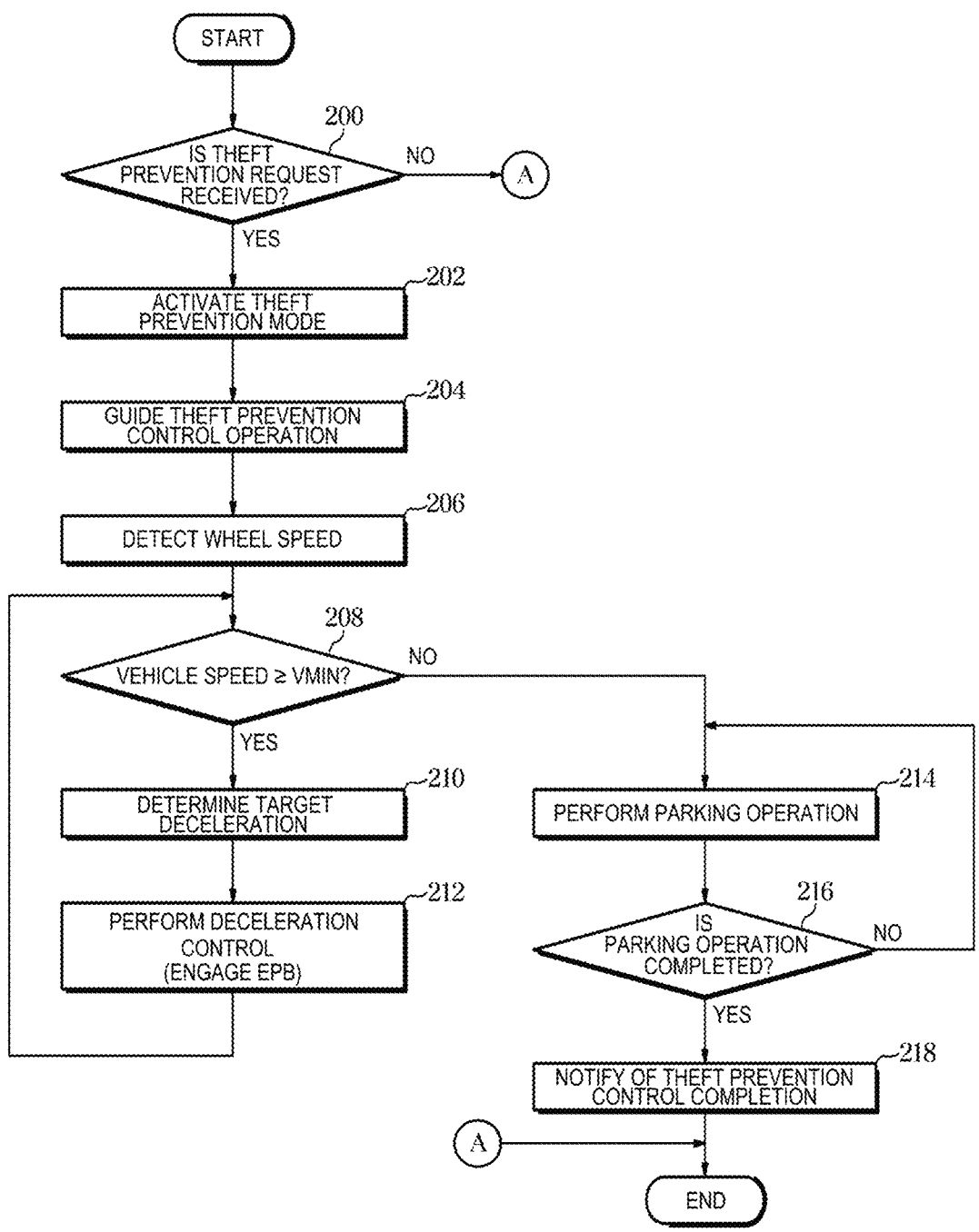
FIG. 3 is a control flowchart of the electronic parking brake system according to the embodiment.

FIG. 3 is a control flowchart of the electronic parking brake system according to the embodiment.

Referring to FIG. 3, first, the controller 30 determines whether the theft prevention request is received (200).

When the theft prevention request is received (200, Yes), the controller 30 performs the theft prevention mode (202).

The controller 30 notifies the vehicle thief that the theft prevention control is operating through the warner 50 (204).

The controller 30 detects the wheel speed of the stolen vehicle (206). The controller 30 may directly detect the wheel speed from a wheel speed sensor and also receive the wheel speed from another system in the vehicle.

The controller 30 determines whether the vehicle speed is greater than or equal to a preset speed Vmin according to the wheel speed (208).

When the vehicle speed is greater than or equal to the preset speed Vmin (208, Yes), the controller 30 determines the target deceleration for stopping the stolen vehicle (210). The target deceleration may be a preset deceleration for stopping the vehicle.

The controller 30 operates the electronic parking brake 10 to perform deceleration control according to the target deceleration (212). The controller 30 performs the deceleration control by engaging the electronic parking brake 10 to generate the braking force and by adjusting the braking force generated by the electronic parking brake 10 so that a current vehicle deceleration reaches the target deceleration. The controller 30 performs the deceleration control according to the target deceleration until the vehicle speed is less than the preset speed Vmin (212).

Meanwhile, when the vehicle speed is less than the preset speed Vmin, the controller 30 performs the parking operation to engage the electronic parking brake 10 (214). During the parking operation, the controller 30 drives the motor 141 to rotate the spindle member 135 in one direction to move the nut member 131 to press the piston 121. The piston 121 pressed by the movement of the nut member 131 presses the inner pad plate 111 to bring the brake pad 113 into close contact with the brake disc 100, thereby generating the engaging force.

After performing the parking operation, the controller 30 determines that the parking operation is completed (216). The controller 30 may detect the current of the motor 141 through the current sensor 40 during the parking operation and determine that the parking operation is completed when the detected motor current reaches the target current.

When the parking operation is completed (216, Yes), the controller 30 notifies of the completion of the theft prevention control (218). The controller 30 transmits the completion of the theft prevention control to a device in the vehicle that can notify the vehicle owner of the completion, to notify the vehicle owner that the theft prevention control is completed.

Figure 4:
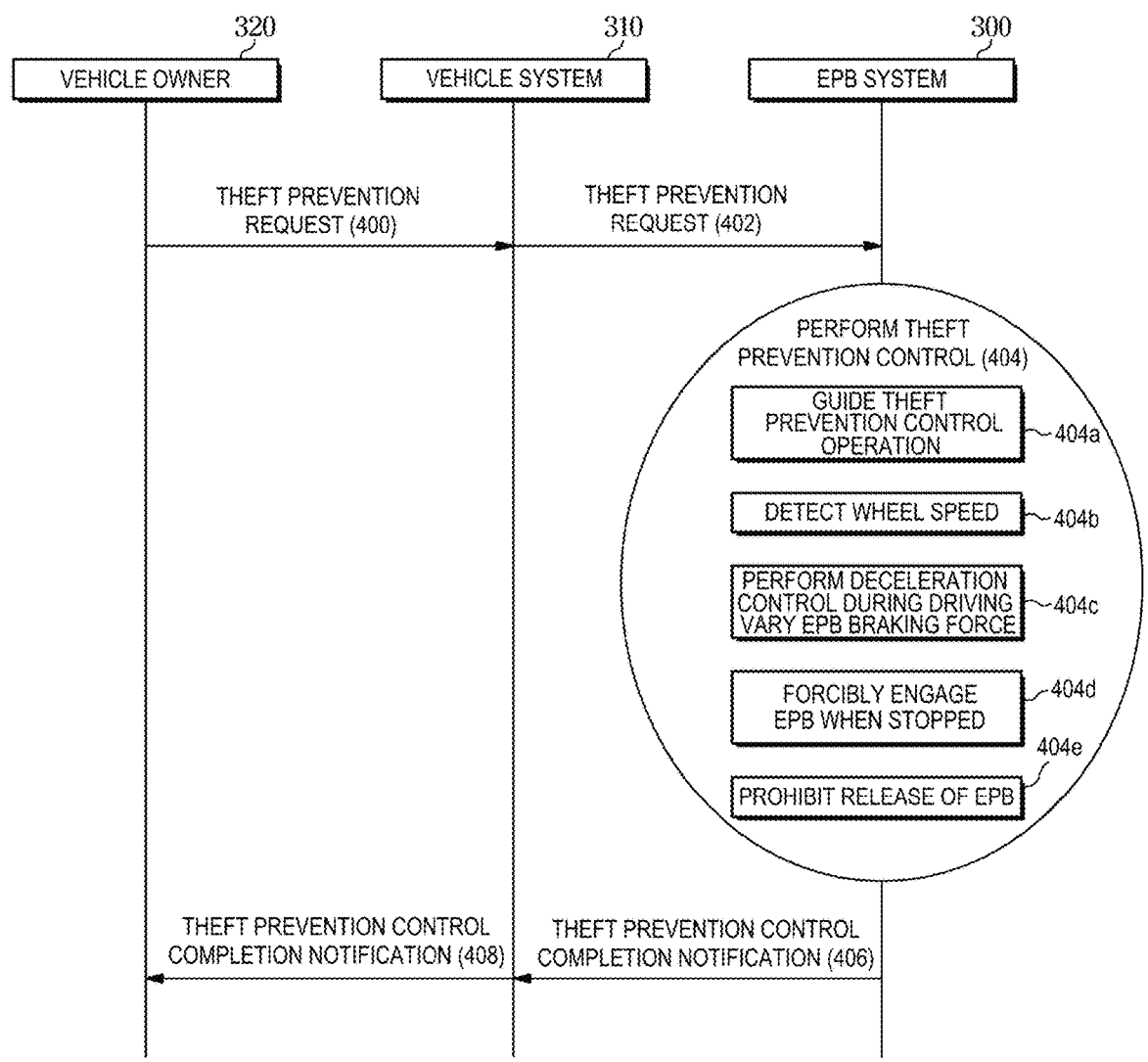
FIG. 4 is a sequence diagram for describing a process of performing theft prevention control according to a theft prevention request from a vehicle owner in the electronic parking brake system according to the embodiment.

FIG. 4 is a sequence diagram for describing a process of performing theft prevention control according to a theft prevention request from a vehicle owner in the electronic parking brake system according to the embodiment.

FIG. 4 illustrates information exchange between an electronic parking brake system 300 provided in the vehicle, a vehicle system 310 connected to the electronic parking brake system 300 in the vehicle through a network, and the vehicle owner having a user terminal such as a mobile phone, a tablet personal computer (PC), a laptop computer, and a desktop computer, which may directly or indirectly communicate with the vehicle system 310 in a remote manner. The vehicle system 310 may include a communication device that may directly or indirectly communicate with a user terminal of an external vehicle owner 320 in a remote manner and an electronic stability control (ESC) device connected to the communication device through a network and connected to the electronic parking brake system 300 electrically or through the network. The ESC device is a device that receives wheel speed information from the wheel speed sensor provided on a wheel side, instantaneously and independently controls four wheels to maintain driving stability when the vehicle is about to slide, and thus improves the driving stability.

First, when the theft of the vehicle is recognized, the vehicle owner 320 transmits the theft prevention request to the vehicle system 310 of the stolen vehicle using the user terminal. In this case, the vehicle system 310 may detect the vehicle theft by itself and transmit a message informing that the vehicle theft has occurred to the mobile device of the vehicle owner 320.

When the vehicle system 310 receives the theft prevention request from the vehicle owner 320, the vehicle system 310 transmits the theft prevention request to the electronic parking brake system 300 (402).

When the electronic parking brake system 300 receives the theft prevention request from the vehicle system 310, the electronic parking brake system 300 performs the theft prevention control of forcibly stopping the stolen vehicle using the electronic parking brake 10 when the stolen vehicle is driving and forcibly engaging the electronic parking brake 10 when the stolen vehicle is stopped (404). During the theft prevention control, the vehicle thief is notified that the theft prevention control is operating (404*a*). The wheel speed of the stolen vehicle is detected (404*b*). The deceleration control in which the electronic parking brake 10 is operated to generate the braking force and the deceleration of the stolen vehicle is controlled to the target deceleration until the stolen vehicle is stopped by varying the generated braking force is performed when the stolen vehicle is driving. When the stolen vehicle is stopped, the electronic parking brake 10 is forcibly engaged so that the stolen vehicle does not move (404*d*). While the theft prevention control is performed, a parking release request from the EPB switch 20 is ignored, and stopping of the operation of the electronic parking brake 10 is prohibited or a release of the electronic parking brake 10 is prohibited.

When the theft prevention control is completed, the electronic parking brake system 300 transmits a theft prevention control completion notification to the vehicle system 310 (406).

When the theft prevention control completion notification is received from the electronic parking brake system 300, the vehicle system 310 provides the vehicle owner 320 with the theft prevention control completion notification (408).

Meanwhile, instead of starting the theft prevention control immediately after a time point when the theft prevention request is received from the vehicle system 310, the electronic parking brake system 300 may start the theft prevention control at a time point when the vehicle thief manipulates the EPB switch 20 to request the parking operation or a specific parking operation condition (for example, a start-up off operation, an auto hold operation, or the like) is satisfied, and thus the parking operation is performed.

Further, the electronic parking brake system 300 may start the theft prevention contact immediately after the time point when the theft prevention request is received from the vehicle system 310 and may start the deceleration control of the theft prevention control at a time point when a speed of the stolen vehicle is lower than a preset speed. That is, the theft prevention control may start when the stolen vehicle is not in a high-speed driving state but in a low-speed driving state or a stopped state.

Figure 5:
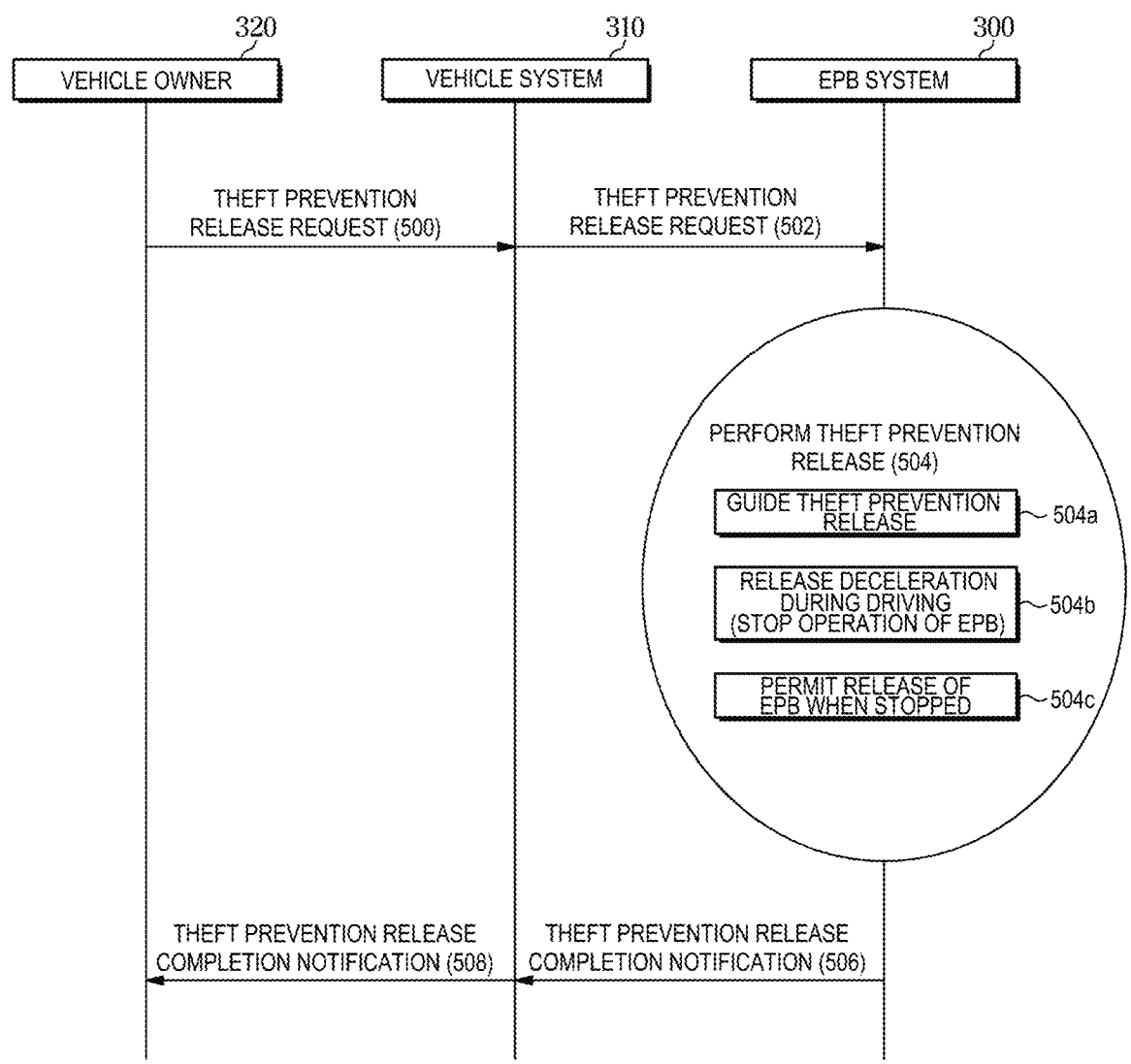
FIG. 5 is a sequence diagram for describing a process of performing theft prevention release according to a theft prevention release request from a vehicle owner in the electronic parking brake system according to the embodiment.

FIG. 5 is a sequence diagram for describing a process of performing theft prevention release according to a theft prevention release request from a vehicle owner in the electronic parking brake system according to the embodiment.

Referring to FIG. 5, when the vehicle owner 320 wants the theft prevention release of the vehicle, the vehicle owner 320 transmits the theft prevention release request to the vehicle system 310 using the user terminal (500).

When the vehicle system 310 receives the theft prevention release request from the vehicle owner 320, the vehicle system 310 transmits the theft prevention release request to the electronic parking brake system 300 (502).

When the electronic parking brake system 300 receives the theft prevention release request from the vehicle system 310, the electronic parking brake system 300 releases the theft prevention control (504). During the theft prevention release, the driver is notified that the theft prevention release is operating (504*a*). When the vehicle is driving, the operation of the electronic parking brake 10 is stopped to release the deceleration control (504*b*). When the vehicle is stopped, a release of the forcibly engaged electronic parking brake 10 is permitted (504*c*). The release of the electronic parking brake 10 is switched from a prohibited state to a permitted state, and the driver may operate the EPB switch 20 to perform the parking release of the electronic parking brake 10.

After the theft prevention release is completed, the electronic parking brake system 300 transmits a theft prevention release completion notification to the vehicle system 310 (506).

When the theft prevention control release completion notification is received from the electronic parking brake system 300, the vehicle system 310 provides the vehicle owner 320 with the theft prevention control release completion notification (508).

As described above, when the theft prevention request is received, the present disclosure can safely and reliably stop the stolen vehicle by generating a braking force for stop control in accordance with a driving state of the stolen vehicle.

Meanwhile, the above-described controller and/or a component thereof may include one or more processor(s)/microprocessor(s) combined with a computer-readable recording medium storing a computer-readable code/algorithm/software. The processor(s)/microprocessor(s) may execute the computer-readable code/algorithm/software stored in the computer-readable recording medium to perform the above-described functions and operations.

The above-described controller and/or the component thereof may further include a memory implemented as a computer-readable non-transitory recording medium or a computer-readable transitory recording medium. The memory may be controlled by the above-described controller and/or the component thereof and may be configured to store data transmitted to the above-described controller and/or the component thereof or received therefrom or store data that has been or will be processed by the above-described controller and/or the component thereof.

The disclosed embodiment can also be implemented as the computer-readable code/algorithm/software on the computer-readable recording medium. The computer-readable recording medium may be the computer-readable non-transitory recording medium, such as a data storage device, which can store the data readable by the processor/microprocessor. Examples of the computer-readable recording medium include a hard disk drive (HDD), a solid state drive (SSD), a silicon disk drive (SDD), a read-only memory (ROM), a compact disc read-only memory (CD-ROM), a magnetic tape, a floppy disk, an optical data storage device, and the like.

Meanwhile, although a motor-on-caliper type electronic parking brake has been described in the above embodiments, the present disclosure is not limited thereto, and an electric drum brake in which a drum rotating together with the wheel is provided thereinside, a pair of brake shoes attached to a brake lining are expanded, and thus braking is performed may be used.

Further, although the electronic parking brake system having the motor-on-caliper type electronic parking brake or the electric drum brake has been described in the above embodiments, the present disclosure is not limited thereto. The electronic parking brake system may be an electromechanical brake system that performs a parking brake function of maintaining a stopped state of the vehicle during parking in addition to a service brake function of providing the braking force in a driving situation of the vehicle.

As is apparent from the above description, when a theft prevention request is received, the present disclosure can safely and reliably stop a stolen vehicle by generating a braking force for stop control in accordance with a driving state of the stolen vehicle.

What is claimed is:

1. An electronic parking brake system comprising:
an electronic parking brake configured to provide a braking force to a vehicle; and
a controller electrically connected to the electronic parking brake and configured to control the electronic parking brake,
wherein the controller is configured to perform theft prevention control that dynamically controls the braking force of the electronic parking brake according to a driving state of a stolen vehicle by maintaining a target deceleration by controlling the electronic parking brake while the stolen vehicle is driving, and forcibly engaging the electronic parking brake while the stolen vehicle is stopping, based on reception of a theft prevention request.

2. The electronic parking brake system of claim 1, wherein the controller is configured to perform deceleration control in which a deceleration of the stolen vehicle is maintained at the target deceleration until the stolen vehicle is stopped by engaging the electronic parking brake, based on driving of the stolen vehicle.

3. The electronic parking brake system of claim 2, wherein the controller is configured to forcibly engage the electronic parking brake, based on stopping of the stolen vehicle by the deceleration control.

4. The electronic parking brake system of claim 1, wherein, while performing the theft prevention control, the controller is configured to:
ignore a parking release request from an electronic parking brake (EPB) switch and
prohibit an operation stop of the electronic parking brake or a release of the electronic parking brake.

5. The electronic parking brake system of claim 1, wherein the controller is configured to:
perform deceleration control in which a deceleration of the stolen vehicle is maintained at the target deceleration until the stolen vehicle is stopped by engaging the electronic parking brake, based on a speed of the stolen vehicle, which is higher than a preset speed, and
forcibly engage the electronic parking brake, based on the speed of the stolen vehicle, which is lower than the preset speed.

6. The electronic parking brake system of claim 1, wherein the controller is configured to start the theft prevention control at a time point at which an engagement of the electronic parking brake is requested.

7. The electronic parking brake system of claim 1, wherein the controller is configured to start deceleration control in which a deceleration of the stolen vehicle is maintained at the target deceleration until the stolen vehicle is stopped by engaging the electronic parking brake at a time point at which a speed of the stolen vehicle is lower than a preset speed.

8. The electronic parking brake system of claim 1, wherein the controller is configured to output theft prevention control completion so that a vehicle owner identifies completion of the theft prevention control, based on the completion of the theft prevention control.

9. The electronic parking brake system of claim 1, wherein the controller is configured to release the theft prevention control, based on reception of a theft prevention release request.

10. The electronic parking brake system of claim 9, further comprising:
a warner configured to guide information to a driver,
wherein the controller is configured to output, to the warner, information notifying that the theft prevention control is released, based on the reception of the theft prevention release request.

11. The electronic parking brake system of claim 10, wherein the controller is configured to output, to the warner, information notifying that a release of the electronic parking brake is permitted, based on forcibly engaging of the electronic parking brake by the theft prevention control.

12. A method of controlling an electronic parking brake system configured to control an electronic parking brake configured to provide a braking force to a vehicle, the method comprising:
determining whether a theft prevention request is received;
determining a driving state of a stolen vehicle, based on the reception of the theft prevention request; and performing theft prevention control that dynamically controls the braking force of the electronic parking brake according to the driving state of the stolen vehicle, based on reception of a theft prevention request, wherein the performing of the theft prevention control comprises:
- performing deceleration control in which a deceleration of the stolen vehicle is maintained at a target deceleration until the stolen vehicle is stopped by engaging the electronic parking brake, based on driving of the stolen vehicle, and
- forcibly engaging the electronic parking brake, based on stopping of the stolen vehicle by the deceleration control.

13. The method of claim 12, wherein the performing of the theft prevention control comprises:
- ignoring a parking release request from an electronic parking brake (EPB) switch while the theft prevention control is performed and
- prohibiting an operation stop of the electronic parking brake or a release of the electronic parking brake.

14. The method of claim 12, wherein the performing of the theft prevention control comprises starting the theft prevention control at a time point at which an engagement of the electronic barking brake is requested or at a time point at which a speed of the stolen vehicle is lower than a preset speed.

15. The method of claim 12, further comprising:
- outputting theft prevention control completion so that a vehicle owner identifies completion of the theft prevention control, based on the completion of the theft prevention control.

16. The method of claim 12, further comprising:
- releasing the theft prevention control, based on reception of a theft prevention release request, and
- outputting information notifying that a release of the electronic parking brake is permitted, based on forcible engaging of the electronic parking brake by the theft prevention control.

* * * * *